Nov. 27, 1956 L. W. ERATH ET AL 2,772,388

AUTOMATIC VOLUME CONTROL

Filed Oct. 18, 1954 2 Sheets-Sheet 1

Louis W. Erath
Paul E. Madeley
Paul W. Geery
INVENTORS

BY Thomas O. Arnold

ATTORNEY

AUTOMATIC VOLUME CONTROL

Filed Oct. 18, 1954 2 Sheets-Sheet 2

Louis W. Erath
Paul E. Madeley
Paul W. Geery
INVENTORS

BY Thomas O Arnold

ATTORNEY 2,772,388
Patented Nov. 27, 1956

2,772,388

AUTOMATIC VOLUME CONTROL

Louis W. Erath, Paul E. Madeley, and Paul W. Geery, Houston, Tex., assignors, by mesne assignments, to Southwestern Industrial Electronics Company, Houston, Tex., a corporation of Delaware Application October 18, 1954, Serial No. 463,024

24 Claims. (Cl. 323—24)

This invention relates to improvements in automatic volume controls and related circuits.

An object of this invention is to provide an improved automatic volume control circuit that will control amplitude variations on the order of a million to one.

Another object of this invention is to provide improved means for obtaining balanced biases on automatic volume control losser diodes and the like.

A further object of this invention is to provide novel means for obtaining balanced bias without the use of batteries.

Another object of this invention is to provide improved means for biasing two diodes connected in opposition to each other, with variable potentials which at all times remain identical to each other.

Still another object of this invention is to provide improved means for controlling the attenuation of a signal at a rate that would otherwise produce spurious signals or transients.

A further object of this invention is to provide improved biasing means which is adaptable to control by an alternating signal and is susceptible to having an alternating signal superimposed thereon .

Still another object of this invention is to provide novel means for obtaining two potentials which simultaneously change equally but inversely with respect to each other.

Still a further object of this invention is to provide an improved automatic volume control circuit whereby transients produced by unbalanced contact potential of tubes therein are reduced.

Yet another object of this invention is to provide means for rapidly changing the value of a resistance and for adapting a small amount of control power to control large currents, all for use in automatic volume control circuits and the like.

Yet a further object of this invention is to provide improved means for rapidly changing the value of the resistance of an automatic control element, in which means the rate of lowering the resistance is substantially independent of the rate of raising the resistance.

Other objects are apparent from the following description and accompanying drawings.

Figure 1:
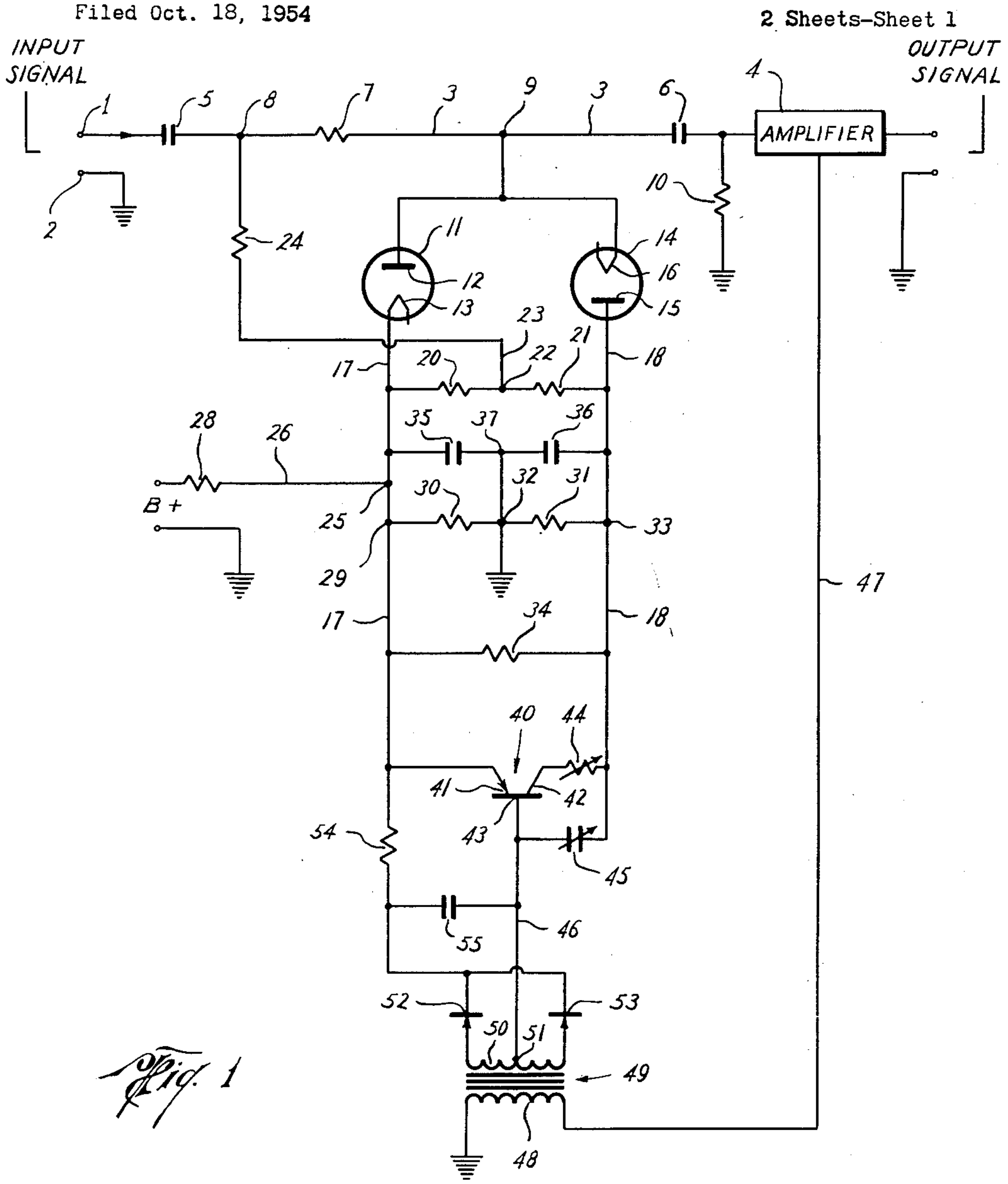
Figure 1 is a circuit diagram of a preferred form of the invention.

Consider that a given input signal, which is subject to volume or amplitude variations, is impressed upon two terminals, such as terminals 1 and 2. Terminal 2 is grounded. The signal is carried via a line 3 to an amplifier 4. It is desired to control the volume of the signal which is applied to the amplifier 4, and to hold that volume at a near constant value.

Conveniently, there may be inserted in the line 3, between the terminal 1 and the amplifier 4, a condenser 5 connected directly to the terminal 1, a condenser 6 connected directly to the amplifier 4, and a losser resistor 7 between the two condensers 5 and 6. Between the resistor 7 and the condenser 5, there is a terminal 8. Between the resistor 7 and the condenser 6, there is a terminal 9. Between the condenser 6 and the amplifier 4, there is a connection, via a resistor 10, to ground.

The losser resistor 7 is most frequently used, but when the terminals 1 and 2 are connected to a source of signal to be volume controlled which has a high internal impedance, then the resistor 7 may be deleted. The important point is that the anode 12 and the cathode 16 (here-after described), which are connected to each other, should also be connected to a source which has an appreciable impedance in comparison with the impedance through the diodes 11 and 14. For these purposes, the terminal 9 is such a source, and it matters not whether there is a resistor 7, or whether there is a resistance inherent in the source at some earlier point in the source circuit.

Since the signal to be controlled is conveyed through the terminal 9, the volume of the signal reaching the amplifier 4 can be controlled by connecting some sort of a resistance between the terminal 9 and ground, and varying that resistance so that it is high when the amplitude of the signal is low, and so that it is low when the amplitude of the signal is high.

For this purpose, a diode 11, with a plate or anode 12 and a cathode 13, and a diode 14, with a plate or anode 15 and a cathode 16, are provided. The plate 12 of the diode 11 and cathode 16 of the diode 14 are connected to the terminal 9. A line 17 is connected to the cathode 13, and a line 18 is connected to the plate 15.

Two equal resistors 20 and 21 may be connected in series by a common terminal 22, the resistor 20 being connected also to the line 17 and the resistor 21 being connected also to the line 18. The common terminal 22 is connected by a line 23 through a resistor 24 to the terminal 8 in the line 3.

The direct current biasing of the two diodes 11 and 14 may be accomplished, in accordance with this invention, by circuitry as follows:

The line 17 is connected at a terminal 25, to a line 26. The line 26 is connected to a source of positive voltage, which may be any convenient source, batteries or otherwise. Conveniently for certain purposes, there may be a resistor 28 in the line 26 to B plus or other source of positive voltage.

Two equal resistors 30 and 31 are connected by a common terminal 32. The resistor 30 is also connected to a terminal 29 in the line 17, and the resistor 31 is also connected to the line 18 at a terminal 33. The common terminal 32 is grounded.

Another resistor 34, preferably of twice the resistance of either of the resistors 30 or 31, is connected between the lines 17 and 18.

It is apparent that current flows from B plus through the resistor 30 to ground, and also from B plus through the resistors 34 and 31 to ground. If the resistors 30 and 31 are equal and if the resistor 34 is twice the resistance of the resistor 31, then the current through the resistor 30 is three times the current through the resistor 31. It follows that while the line 18 (and the anode 15), and the line 17 (and the cathode 13), are both positive with respect to ground, the line 18 (and anode 15) are maintained at a potential which is negative with respect to the line 17 (and the cathode 13).

The cathode 13 is thus biased positive with respect to the anode 15 by the potential difference between the lines 17 and 18. The circuitry of the elements 20 through 24, the line 3 and the terminal 9, operates, when the two diodes are not conducting, to electrically orient the plate 12 and the cathode 16 to assume a potential half way between the potential of the lines 17 and 18. Hence, there is always a bias across each tube, equal to half the potential difference between the two lines 17 and 18.

It is apparent that the potential, with respect to ground, of the lines 17 and 18, and of the elements in the tubes 11 and 14, may be varied depending upon the choice of the potential of the B plus source and the resistance of the B plus resistor 28. In any instance, however, variations in potential of the B plus affect the difference between the potentials of the lines 17 and 18, and affect the line 17 to terminal 22, and the line 18 to terminal 22 potential differences equally and oppositely. Hence we have obtained, in the potential difference from the line 17 to the terminal 22, and in the potential difference from the line 18 to the terminal 22, two voltages which vary in direct inverse proportion with respect to each other. It is these two voltages which are applied to bias the two diodes 11 and 14, each tube being connected so that its cathode is positive with respect to its anode or plate.

For example, resistor and B plus values may be chosen so that the line 17 and cathode 13 assume a potential of plus 5 volts with respect to ground and the line 18 and the plate 15 assume a potential of plus 1 volt with respect to ground. The terminal 22 then assumes a potential of plus 3 with respect to ground. No appreciable direct current flows through the line 23, resistor 24 and resistor 7. Accordingly, the plate 12 and the cathode 16 also assume a potential of plus 3 volts with respect to ground. The bias from each plate to each cathode of the tubes 11 and 14 is then seen to be identical—two volts. If the potential of the line 17 with respect to ground is raised, the potential of the line 18 is also raised but to a lesser extent, thereby increasing the spread between the two. The bias on both tubes also increases, but on each tube it remains at ½ the difference in potential between the lines 17 and 18. The bias on each of the tubes thereby remains identically the same, subject only to the limitations of finding and connecting into circuits, resistors of truly identical resistance.

An obviously equivalent structure is accomplished by connecting the line 18 to a source of negative voltage, in lieu of connecting the line 17 to a source of positive voltage. It is desired to orient either line 17 or line 18 at a predetermined potential with respect to ground whereby current tends to flow between ground and both of said lines in such manner as to orient the line 17 positive with respect to the line 18, and either negative biasing of line 18 or positive biasing of line 17 works. Phrased generically, a source of biasing voltage (whether positive or negative is of no consequence) is connected to the circuit described above, so as to cause current flow between such source and ground by at least two alternative paths, which current flow orients the line 17 at a potential more positive than the line 18.

Hereinabove a preferred means for biasing the tubes 11 and 14 to non-conductivity has been discussed. Alternatively, the tubes 11 and 14 may be biased almost to conductivity, but maintained conductive by the effect of the feedback or error voltage hereinafter described. Once the tubes are made conductive, an alternating signal is passed through them, half the cycle passing through the tube 11 and the other half through the tube 14. Conveniently the cathode 13 of the tube 11 and the plate 15 of the tube 14 may be connected to ground, for purposes of the alternating signal, through a pair of condensers 35 and 36, connected together at a common terminal 37. The condenser 35 is also connected to the line 17 and the condenser 36 is also connected to the line 18. The common terminal 37 may be grounded either directly, or, effectively for alternating signals of interest, through a condenser (not shown).

The conductivity of the tubes 11 and 14, and hence the attenuation of the automatic volume control of the circuit, is controlled by the voltage which may be impressed across the tube elements at any given time. This voltage can be varied in any one of a number of ways, such as changing the resistance of the resister 34, or placing another resistance of variable type in parallel with the resistor 34 (see Figure 1), or placing a source of control voltage in either in series with the resistor 34 or otherwise between the lines 17 and 18 (see Figure 2).

In the preferred embodiment illustrated in Figure 1, the transistor 40 with an emitter 41, a collector 42 and a base 43 is used. The emitter 41 is connected to the line 17. The collector 42 may be connected through a variable resistor 44 to the line 18. The base 43 may be connected through a variable condenser 45 to the line 18, and is also connected by a line 46 to some source of a signal which is to determine the amount of resistance which the transistor 40 is to offer between the lines 17 and 18, in parallel with the resistor 34. Phrased another way, the transistor 40 is a form of switch which is used to turn conductance between the lines 17 and 18 up or down rapidly and with little demand for activating power.

The source of activating power may be the amplifier 4, from which a feedback signal is derived through a line 47. The line 47 is connected to the primary 48 of a transformer 49. The secondary 50, of the transformer 49, is provided with a center tap 51 to which the line 46 is connected. The two end terminals of the secondary 50 are connected to rectifiers 52 and 53 adapted to conduct to the line 17. The term conduct, as here used, means to conduct the flow of current in the commonly used sense wherein current flows from positive to negative; the actual flow of electrons is from the line 17 to the end terminals of the secondary 50.

If desired, a resistor 54 may be placed in the line 17 between the connection to the emitter 41 and the connection to the rectifiers 52 and 53, and a condenser 55 may be connected between the line 17 and the line 46, forming a filter to smooth out the signal derived from the rectifiers.

When no feedback signal is being derived from the amplifier 4, the voltage between the emitter 41 and the base 43 is zero, and the resistance offered to flow between the lines 17 and 18 through the transistor 40 is relatively high. When a signal is derived from the amplifier 4, it is transmitted through the transformer 49 and rectified by the two rectifiers 52 and 53, thereby making the emitter 41 positive with respect to the base 43. When this occurs, the resistance of the transistor between the lines 17 and 18 becomes lower and if a sufficient voltage is impressed between the emitter and the base, this resistance can be reduced to very low values. It is of interest to note that only minute quantities of power are required for the control effected by the transistor 40.

While the embodiments of the invention shown indicate the amplifier 4 as the original source of feedback type of error or control voltage, it is obvious that the original source of error or control voltage might be any source of a signal, in response to which the conductance of the tubes 11 and 14 is to be varied. If the original source of control voltage is of alternating current form, it may be rectified into direct current form by circuit means having negative and positive output terminals. Such terminals then become, for purposes of the remainder of the invention, the effective source of the control voltage of direct current form. Further, in an alternative embodiment of the invention not explained in detail herein, a fairly high frequency alternating current control frequency is applied directly to the transistor base and emitter. The amplitude of the half cycle driving the emitter negative does not materially effect the conductance of the transistor or the attenuation of the *avc* circuit, but the half cycle driving the emitter positive repeatedly "opens the valve" for current flow through the transistor. Such alternating control signal is seen to give the same net result, in pulsations, that direct current accomplishes more smoothly.

The rate of change in attenuation of the automatic volume control is also of interest in some adaptations of this invention. If the variable resistor 44 and the variable capacitor 45 are both set for zero values, then any impulse from the feedback line 47 operates almost instantaneously, through the transistor 40, to almost short circuit the lines 17 and 18, thereby reducing the voltage across the tube elements, causing them to conduct freely and effecting great attenuation of the signal carried by the line 3. The actual control voltage across the elements of the tubes 11 and 14 is seen to be the resultant of both the bias and the feedback or error signal derived from the line 47.

If, however, the variable resistor 44 is set at some predetermined value, the potential difference between the lines 17 and 18 can be reduced only as fast as the capacitors 35 and 36 can discharge through the resistor 44 and those elements in parallel with it. Hence, the attack time for this automatic volume control circuit, i. e., the time in which it responds to surges of high amplitude signal and commences to attenuate that signal, can be controlled by varying the resistor 44.

The recovery time, i. e., the time in which the circuit responds to sudden decreases in amplitude of signal, is controlled by separate means. As the feedback signal from the line 47 diminishes, the potential of the base 43 of the transistor 40 returns toward the potential of the emitter 41, thus causing the transistor 40 to increase its resistance to current flow between the lines 17 and 18. At this same time, the collector 42 moves toward a potential which is more negative with respect to the base 43. The variable capacitor 45, connected between the line 18 and the base, effects a sort of degenerative feedback, causing the potential of the base 43 to return to the potential of the emitter 41 more slowly. The greater the coupling through the capacitor 45, the slower the recovery of the circuit.

The attack time may thereby be controlled by setting the variable resistor 44, while the recovery or release time is controlled by setting the variable capacitor 45.

The effective value of the B plus, acting through the B plus resistor 28, is preferably chosen so that the tubes 11 and 14 are biased barely to nonconductance. The feedback circuit is adjusted to provide some error signal at all times, so that the resultant control voltage across the tube elements permits the tubes to conduct at all times. By this device of having the diodes conduct at all times, the transients which are introduced in other automatic volume control circuits by the difference in contact potentials of the two tubes are largely avoided.

Also, if the two tubes 11 and 14 are allowed to conduct at all times after the system is set in operation, there is no need for the resisters 20, 21 and 24 nor the circuitry appurtenant thereto. For by the act of conducting, the plate 12 and the cathode 16 of the two diodes 11 and 14 keep themselves properly oriented with respect to the potentials of the lines 17 and 18 which provide the controlling voltage to the tubes. Accordingly, in the preferred form of the invention, the circuit may be simplified from that illustrated in Figure 1 by the elimination of the circuitry indicated by the numerals 20 through 24.

Direct current or transient elements in the primary signal derived from the terminals 1 and 2 may be isolated from the automatic volume control circuit by the capacitor 5, thereby avoiding any upset of the orientation of the plate 12 and cathode 16 by such elements. Most of the transients that are introduced into the system by any slight unbalance in the elements used therein or otherwise, may be eliminated from the signal fed to the amplifier 4 by use of the R-C combination 10 and 6.

The particular embodiment of this invention which has been described above assumes use of a so-called PNP transistor. Those familiar with the art will appreciate that an NPN transistor can be used with equal effectiveness. Also, it is understood that while the use of vacuum tube diodes is contemplated in the preferred embodiment of the invention described, semi-conductor diodes can be used. Further, the use of any vacuum tube with more than two elements, when the additional elements do not change the rectifying nature of the tube's operation, is still use of a diode within the meaning of that word as used herein.

It is apparent that in the embodiment of the invention illustrated in Figure 1 and described above, the control voltage on the diodes can vary only from cutoff to zero. In most applications of the invention, this is sufficient. However, the embodiment of the invention illustrated in Figure 2 affords opportunities for greater attenuation by actually driving the cathodes of the tubes negative with respect to their respective anodes. This may be done by placing a source of error signal in series with the resistor 34, or in the alternative, by placing a source of error signal across the lines 17 and 18, as illustrated in Figure 2.

Figure 2:
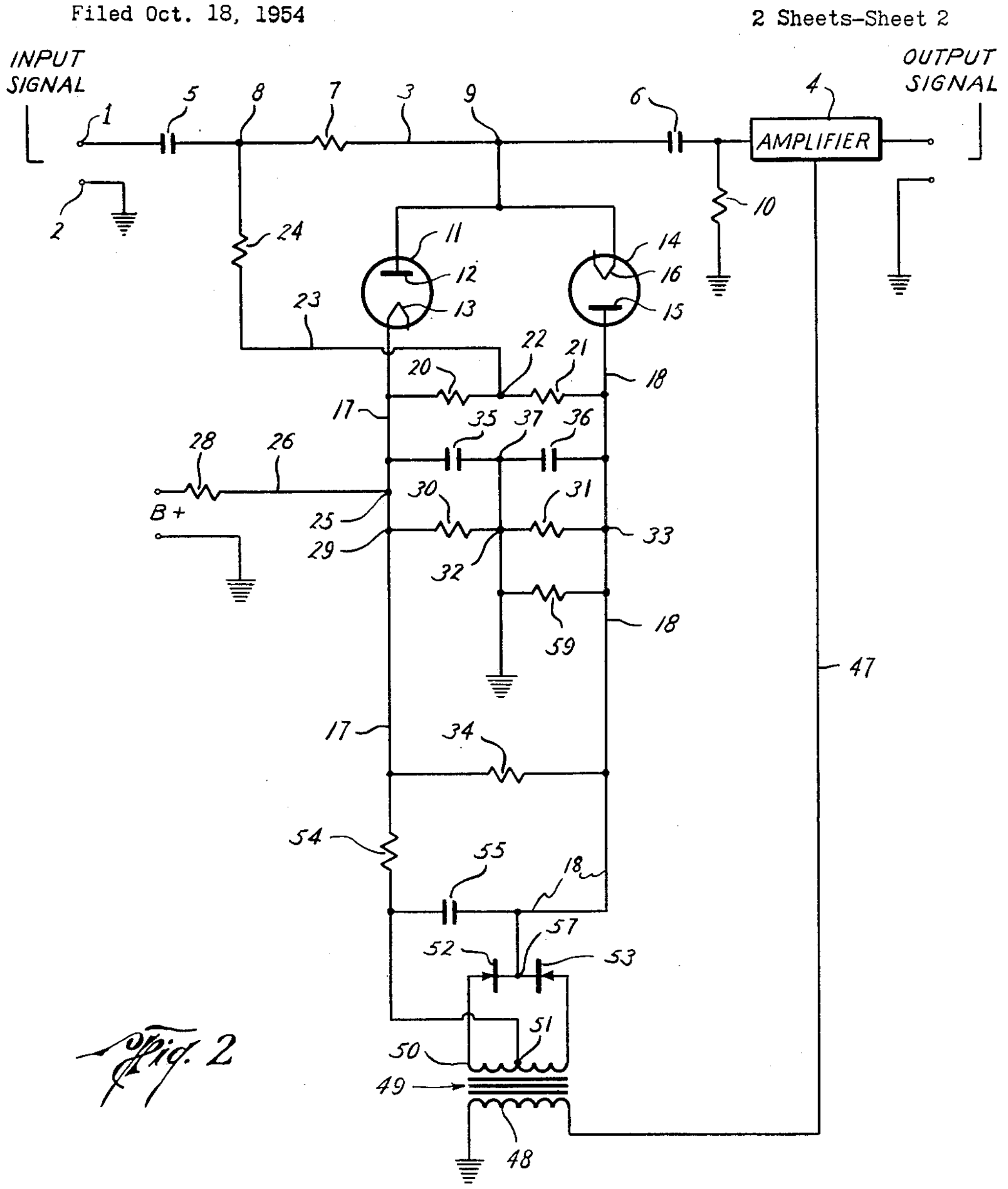
Figure 2 is a circuit diagram of a second embodiment of the invention.

The circuit of Figure 2 includes the elements number 1 through 34 of the circuit of Figure 1. Further, the feedback line 47 is included and the filter composed of the resistor 54 and the capacitor 55 is included. Again there is a primary 48 of a transformer 49. There is a secondary 50 of that transformer with a center tap 51. Also, the two ends of the secondary 50 are connected to two rectifiers 52 and 53.

However, in this embodiment, the center tap 51 is connected to the line 17, and the two rectifiers 52 and 53 are connected to conduct toward the line 18 through a terminal 57.

The system functions as previously described in connection with the circuit of Figure 1, to bias the diodes 11 and 14 as desired, either to cut off or nearly to cut off. A feedback signal derived through the line 47 is rectified and impressed between the lines 17 and 18 to make the line 18 less negative, with respect to the line 17. If the feedback signal is large, it will drive the line 18 so far as to make it positive with respect to the line 17, thus causing much greater conductance of the two diodes 11 and 14, and much greater attenuation of the signal being carried by the line 3.

Note that there is a circuit for current generated in the B plus source, through the resistor 28, the line 26, terminal 25, terminal 29, resistor 30 and terminal 32 to ground. There is also a circuit for this same current generated in the B plus source, through the resistor 28, the line 26, terminals 25 and 29, line 17, resistor 34, line 18, resistor 31 and terminal 32 to ground. The same potential, the B plus source, generates the current for both these circuits, and it is the relationship of these circuits that provides the balanced bias.

Note also, however, that there are two circuits for the current generated in the transformer 49. One circuit goes through the terminal 57, the line 18, through the two resistors 31 and 30 with the resistor 34 in parallel with them, through the line 17 back to the transformer. In this circuit, both the resistors 30 and 31 carry the same current components.

The second circuit from the transformer is through the terminal 57 and the line 18, the resistor 31, thence to ground, through the B plus and the B plus resistor 28 to the line 17, and eventually back to the transformer. Through the ground connection of the terminal 32 and the ground side of the B plus, there is a current path which is parallel to the path through the resistor 30. Therefore the resistor 30 does not carry all the current from the source of error voltage, that the resistor 31 carries, and the potentials on the two tubes are not balanced when an error signal is being derived from the transformer 49. The balance can be restored by inserting another resistor 59, between the line 18 and ground, in parallel with the resistor 31. The resistor 59 is of the same resistance as the resistor 28 plus the internal resistance of the B plus source. Alternatively, a single resistor may be used in place of the two resistors 31 and 59, such single resistor having a resistance equal to the resistance of the parallel circuit from ground to the line 17 through the resistor 30, and from ground to the line 17 through the B plus source and resistor 28.

The circuit of Figure 2 demands substantially more power than the circuit of Figure 1, and is capable of a wider range of attenuation than the circuit of Figure 1. Since the power requirements of the circuit of Figure 1 are so small, in some adaptations of the circuit, the transformer 49 may be discarded in favor of some less bulky coupling, thereby permitting the construction of a very small and light weight unit, by the use of miniature parts throughout.

In the operation of either of the two particular embodiments of the invention illustrated, the tubes are actually biased by the action of the B plus voltage. The conductivity of the tubes is controlled, in one manner or another, by the feedback or error signal. Hence, the error signal is also the control signal. The transistor 40 and appurtenant circuitry constitutes one means for applying this error or control voltage to control the relative potential difference between the cathode 13 of the first tube 11 and the anode 15 of the second tube 14. The direct connection of the direct current form of error signed to the lines 17 and 18 is of course another such means.

In the embodiment of the invention illustrated in Figure 1, it is apparent that the resistor 34 and the transistor 40 with resistor 44, constitute parallel elements connected between the cathode 13 and the anode 15, each element having a resistance. In their effect, they are as one variable resistor connected between the same two elements. It is apparent that the resistor 34 can be eliminated entirely, if the error signal is adjusted to always have a minimum value sufficiently large to assure that the resistance of the transistor 40 does not exceed permissible values. It is also apparent that the source of control voltage, in the embodiment of Figure 2, can be placed in series with the resistor 34, rather than in parallel with it as shown. In such a series connection, it still effects control of the relative potential difference between the cathode of the first tube 11 and the anode of the second tube 14. In fact, the resistor 34 may be eliminated altogether, and the internal resistance of the circuitry providing the control voltage may serve the purposes of the resistor 34. In all of these variations, there still remains connected between the cathode 13 and the anode 15, some circuit means which presents a resistance to current flow from that cathode to that anode, and which may at the same time constitute a part of the means for controlling current flow from one of those elements to the other.

Modifications, a few of which have been indicated above, may be made in the invention as shown in the drawings and herein particularly described, without departure from the scope of the invention. Accordingly, the foregoing description is to be regarded as illustrative only, and is not to be construed as any limitation upon the invention as described in the following claims.

We claim:

1. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; a source of error voltage; means for applying said error voltage to control the relative potential difference between said first cathode and said second anode.

2. Means for biasing two electron tubes, each with a cathode and an anode, comprising a connection between the anode of the first of said tubes and the cathode of the second of said tubes; means for connecting the cathode of the first of said tubes to a source of positive voltage; a first biasing resistor connected between the cathode of said first tube and ground; a second biasing resistor connected between the anode of said second tube and ground; the total resistance from ground to the cathode of said first tube being substantially equal to the total resistance from ground to the anode of said second tube; the cathode of said first tube being further connected to the anode of said second tube through another element having a resistance.

3. The invention defined in claim 2 characterized by the addition to the circuit of a center-tapped resistor connected between the cathode of said first tube and the anode of said second tube, and the addition to the circuit of another resistor with one terminal connected to the center-tap of the last named resistor and the other terminal connected to the anode of said first tube and the cathode of said second tube.

4. Circuitry comprising a first diode with a first anode and a first cathode and a second diode with a second anode and a second cathode, said first anode being connected to said second cathode, and means for biasing said first cathode to a potential relatively more positive than said second anode; all in combination with means for controlling the conductivity of said diodes comprising a transistor with emitter, collector and base; said emitter being connected to said first cathode and said collector being connected to said second anode; a source of control voltage; said emitter and said base being further connected across said source of control voltage.

5. Circuitry comprising a first diode with a first anode and a first cathode and a second diode with a second anode and a second cathode, said first anode being connected to said second cathode, and means for biasing said first cathode to a potential relatively more positive than said second anode; all in combination with means for controlling the conductivity of said diodes comprising a transistor with emitter, collector and base; said emitter being connected to said second anode and said collector being connected to said first cathode; a source of control voltage; said emitter and said base being further connected across said source of control voltage.

6. The invention described in claim 4 characterized by the addition of a variable resistor between said collector and said second anode and the addition of a variable capacitor connected between said base and said second anode.

7. The invention described in claim 5 characterized by the addition of a variable resistor between said collector and said first cathode and the addition of a variable capacitor connected between said base and said first cathode.

8. A circuit for automatic volume control and the like comprising a first vacuum tube and a second vacuum tube each with at least an anode and a cathode; the anode of said first vacuum tube and the cathode of said second vacuum tube being connected to each other; an element having resistance connected to the anode of said first vacuum tube and adapted for connection to a source of a signal to be volume controlled; two condensers of substantially the same capacitance connected in series between the cathode of said first tube and the anode of said second tube; two resistors connected in series between the cathode of said first tube and the anode of said second tube; the cathode of said first tube being adapted for connection to a source of positive voltage; additional circuit means connected between the cathode of said first tube and the anode of said second tube and presenting a resistance to current flow from one of said elements to the other; circuitry adapted to supply a control voltage; means for controlling the potential difference between the cathode of said first tube and the anode of said second tube with said control voltage.

9. The circuitry described in claim 8 characterized by the common terminal between said two resistors being connected to ground and by the common terminal between said two condensers being connected, effectively for alternating signals, to ground.

10. Electrical apparatus comprising a first vacuum tube and a second vacuum tube each having an anode and a cathode; the anode of said first tube being connected to the cathode of said second tube; an element having resistance being connected to the anode of said first tube and being adapted for connection to a source of an alternating signal; the cathode of said first tube being adapted for connection to a source of positive voltage; two condensers of substantially equal capacitance connected in series with each other and between the cathode of said first tube and the anode of said second tube, the common terminal between said two condensers being connected, effectively for alternating signals, to ground; two resistors connected in series between the cathode of said first tube and the anode of said second tube, the common terminal between said two resistors being connected to ground; the resistance of said two resistors being so chosen that the total effective resistance from ground to the cathode of said first tube is equal to the total effective resistance from ground to the anode of said second tube; additional circuitry between the cathode of said first tube and the anode of said second tube providing both resistance between such elements and a source of control voltage tending to drive the anode of said second tube toward a potential more positive with respect to the cathode of said first tube.

11. Electrical apparatus comprising a first vacuum tube and a second vacuum tube each having an anode and a cathode; an anode of said first tube being connected to the cathode of said second tube; an element having resistance being connected to the anode of said first tube and being adapted for connection to a source of an alternating signal; the anode of said second tube being adapted for connection to a source of negative voltage; two condensers of substantially equal capacitance connected in series with each other and between the cathode of said first tube and the anode of said second tube, the common terminal between said two condensers being connected, effectively for alternating signals, to ground; two resistors connected in series between the cathode of said first tube and the anode of said second tube, the common terminal between said two resistors being connected to ground; the resistance of said two resistors being so chosen that the total effective resistance from ground to the cathode of said first tube is equal to the total effective resistance from ground to the anode of said second tube; additional circuitry between the cathode of said first tube and the anode of said second tube providing both resistance between such elements and a source of control voltage tending to drive the anode of said second tube toward a potential more positive with respect to the cathode of said first tube.

12. The apparatus described in claim 11 characterized by said last mentined additional circuitry comprising a resistor connected between the cathode of said first tube and the anode of said second tube; a transformer with primary coil connected to receive an alternating current control signal and with a secondary coil having at least two terminals; one of said terminals of said transformer being connected to the cathode of said first tube; at least one rectifier with the negative side thereof connected to the other of said terminals of said transformer and with the positive side thereof connected to the anode of the second of said tubes.

13. Electrical apparatus comprising a first vacuum tube and a second vacuum tube each having an anode and a cathode; the anode of said first tube being connected to the cathode of said second tube and being further adapted for connection, through an impedance to a source of an alternating signal; the cathode of said first tube being adapted for connection to a source of positive voltage; two condensers of substantially equal capacitance connected in series with each other and between the cathode of said first tube and the anode of said second tube, the common terminal between said two condensers being connected effectively for alternating signals, to ground; two resistors of substantially equal resistance connected in series between the cathode of said first tube and the anode of said second tube, the common terminal between the said two resistors being connected to ground; still another resistor connected between the cathode of said first tube and the anode of said second tube; a transistor with emitter, collector and base, said emitter being connected to the cathode of said first tube; a variable resistor connected to the anode of said second tube and to said collector; a variable capacitor connected to the anode of said second tube and to said base; a source of direct current control voltage with the negative side thereof connected to said base and the positive side thereof connected to the cathode of said second tube.

14. The apparatus described in claim 13 characterized by the addition of two additional resistors of equal resistance connected in series between the cathode of said first tube and the anode of said second tube, and by the addition of still another resistor connected between the common terminal between said last named series connected resistors and to the anode of said first tube and cathode of said second tube.

15. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; a source of error voltage; means for applying said error voltage to control the relative potential difference between said first cathode and said second anode; and a series connection of two condensers between said first cathode and said second anode, the common terminal between said two condensers being adapted for connection, effectively for alternating current signals, to ground.

16. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; a source of positive voltage connected to said first cathode; a source of error voltage; means for applying said error voltage to control the relative potential difference between said first cathode and said second anode.

17. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; a source of negative potential connected to said second anode; a source of error voltage; means for applying said error voltage to control the relative potential difference between said first cathode and said second anode.

18. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; additional circuitry connecting said first cathode and said second anode; a terminal adapted for connection to a source of biasing voltage, said terminal being connected to said additional circuity and to one of said two resistors so as to cause current to flow between such source and said ground by at least two alternative paths, which current flow orients said first cathode at a potential more positive than said second anode.

19. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; a source of error voltage; means for applying said error voltage to control the relative potential difference between said first cathode and said second anode, such means comprising a transistor with emitter, collector and base, said emitter being connected to said first cathode, said collector being connected to said second anode, and said emitter and said base being connected to said source of error voltage.

20. For use in combination with a source of an alternating current signal, which source has appreciable impedance and has a first output terminal which may be characterized as ground and a second output terminal, the combination of a first diode with a first anode and a first cathode; a second diode with a second anode and a second cathode; said first anode and said second cathode being adapted for connection to said second terminal; two resistors connected in series between said first cathode and said second anode, the common terminal between said two resistors being also adapted for connection to ground; a source of error voltage; means for applying said error voltage to control the relative potential difference between said first cathode and said second anode, said means comprising a transistor with emitter, collector and base, said emitter being connected to said second anode, said collector being connected to said first cathode, and said emitter and base being connected to said source of error voltage.

21. Apparatus comprising a first diode with a first anode and a first cathode; a second diode with a second anode and a second cathode; a connection between said first anode and said second cathode; a first biasing resistor connected between said first cathode and ground; a second biasing resistor connected between said second anode and ground; a voltage source adapted to impress a biasing voltage upon the nonground end of one of said resistors; said first cathode being further connected to said second anode through another circuit including resistance; the resistance values of the various resistors and elements including said voltage source being so chosen that the total resistance from ground to said first cathode through the various alternative paths is substantially equal to the total resistance from ground to said second anode through the various alternative paths.

22. The invention defined in claim 21 wherein the positive terminal of said voltage source is connected to said first cathode.

23. The invention defined in claim 21 wherein the negative terminal of said voltage source is connected to said second anode.

24. For use in combination with a source of an alternating current signal, which source has appreciable impedance and has a first output terminal which may be characterized as ground and a second output terminal, the combination of a first unidirectional conductive device with a first anode and a first cathode; a second unidirectional conductive device with a second anode and a second cathode; said first anode and said second cathode being adapted for connection to said second terminal; two resistors connected in series between said first cathode and said second anode, the common terminal between said two resistors being also adapted for connection to ground; means for deriving a control voltage from said output terminals which control voltage is responsive to variations in the output voltage at said output terminals; means for applying said control voltage to control the relative potential difference between said first cathode and said second anode.

References Cited in the file of this patent

UNITED STATES PATENTS 2,703,382 Cleary ................ Mar. 1, 1955